(12) United States Patent
Imamura et al.

(10) Patent No.: US 11,826,975 B2
(45) Date of Patent: Nov. 28, 2023

(54) MOLDED ARTICLE AND MANUFACTURING METHOD FOR MOLDED ARTICLE

(71) Applicant: DAIKIN INDUSTRIES, LTD., Osaka (JP)

(72) Inventors: Hitoshi Imamura, Osaka (JP); Tatsuya Funaoka, Osaka (JP); Takeshi Shimono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 351 days.

(21) Appl. No.: 16/325,327

(22) PCT Filed: Aug. 10, 2017

(86) PCT No.: PCT/JP2017/029135
§ 371 (c)(1),
(2) Date: Feb. 13, 2019

(87) PCT Pub. No.: WO2018/034238
PCT Pub. Date: Feb. 22, 2018

(65) Prior Publication Data
US 2019/0202151 A1 Jul. 4, 2019

(30) Foreign Application Priority Data

Aug. 16, 2016 (JP) .................................. 2016-159620

(51) Int. Cl.
| | | |
|---|---|---|
| B29D 23/00 | (2006.01) | |
| C08J 7/12 | (2006.01) | |
| F16L 11/04 | (2006.01) | |
| B29C 35/08 | (2006.01) | |
| C08F 214/26 | (2006.01) | |
| C08F 214/28 | (2006.01) | |
| C08L 27/18 | (2006.01) | |
| C08L 27/20 | (2006.01) | |
| B29K 27/18 | (2006.01) | |

(52) U.S. Cl.
CPC ............ *B29D 23/001* (2013.01); *B29C 35/08* (2013.01); *C08F 214/262* (2013.01); *C08F 214/282* (2013.01); *C08J 7/123* (2013.01); *C08L 27/18* (2013.01); *C08L 27/20* (2013.01); *F16L 11/04* (2013.01); *B29C 2035/0877* (2013.01); *B29K 2027/18* (2013.01); *C08J 2327/12* (2013.01); *C08L 2203/18* (2013.01); *C08L 2205/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,169,868 B2 * | 1/2007 | Aoyama | .................. | C08F 8/22 |
| | | | | 152/209.1 |
| 2002/0028895 A1 * | 3/2002 | Iwasaki | ............. | C08F 216/1408 |
| | | | | 526/243 |
| 2007/0141285 A1 * | 6/2007 | Lahijani | ................. | B29C 48/09 |
| | | | | 428/36.9 |
| 2011/0213089 A1 | 9/2011 | Yamasaki et al. | | |
| 2015/0015988 A1 | 1/2015 | Nohta et al. | | |
| 2015/0252522 A1 | 9/2015 | Setoguchi et al. | | |
| 2016/0319089 A1 | 11/2016 | Imamura et al. | | |
| 2016/0340455 A1 | 11/2016 | Abe et al. | | |
| 2017/0260344 A1 | 9/2017 | Imamura et al. | | |

FOREIGN PATENT DOCUMENTS

| | | | | | |
|---|---|---|---|---|---|
| JP | 10254198 | A | * | 9/1998 | |
| JP | 2001088816 | A | * | 4/2001 | |
| JP | 2002-327068 | A | | 11/2002 | |
| JP | 2005298718 | A | * | 10/2005 | |
| JP | 3853301 | B2 | * | 12/2006 | |
| JP | 2011-052063 | A | | 3/2011 | |
| JP | 2014-028952 | A | | 2/2014 | |
| JP | 2015-147924 | A | | 8/2015 | |
| KR | 20120024016 | A | * | 3/2012 | |
| TW | 201414536 | A | | 4/2014 | |
| WO | WO-2006082778 | A1 | * | 8/2006 | ............ C08F 259/08 |
| WO | 2014/007346 | A1 | | 1/2014 | |
| WO | WO-2015008649 | A1 | * | 1/2015 | .............. C08L 27/18 |
| WO | 2015/129762 | A1 | | 9/2015 | |
| WO | 2016/117492 | A1 | | 7/2016 | |

OTHER PUBLICATIONS

Okada "A novel KrF laser-induced graft reaction of poly(acrylic acid) onto tetrafluoroethylene-perfluoroalkyl vinyl ether copolymer film", Polymer, 1996, vol. 37, No. 11, pp. 2281-2283 (Year: 1996).*
Coupe "Surface Modification of Poly(tetrafluoroethylene-co-hexafluoropropylene) by Adsorption of Functional Polymers", Langmuir, 2001, 17, 1956-1960 (Year: 2001).*
Dasilva Adhesion of copper to poly(tetrafluoroethylene-co-hexafluoropropylene) (FEP) surfaces modified by vacuum UV photo-oxidation downstream from Ar microwave plasma, J. Adhesion Sci. Technol., 2004, vol. 18, No. 12, 1465-1481 (Year: 2004).*
Machine translation of JP 2005-298718 A, retrieved May 2021 (Year: 2021).*
Bürger, "Radiation Degradation of Fluoropolymers: Carboxylated Fluoropolymer from Radiation Degradation in Presence of Air", Journal of Applied Polymer Science, 1993, vol. 48, 1973-1985 (Year: 1993).*

(Continued)

*Primary Examiner* — Nicole M. Buie-Hatcher
(74) *Attorney, Agent, or Firm* — Sughrue Mion, PLLC

(57) ABSTRACT

The invention provides a molded article containing a specific fluororesin and having excellent hydrophilicity. The molded article containing the fluororesin has a melt flow rate of 1.00 g/10 min or lower and a water contact angle of 90° or smaller. The fluororesin contains at least one copolymer selected from the group consisting of a copolymer containing a tetrafluoroethylene unit and a perfluoro(alkylvinylether) unit and a copolymer containing a tetrafluoroethylene unit and a hexafluoropropylene unit.

9 Claims, No Drawings

(56) References Cited

OTHER PUBLICATIONS

Machine translation of KR 20120024016 A, retrieved Jul. 2023. (Year: 2023).*

International Preliminary Report on Patentability with English Translation of the Written Opinion of PCT/JP2017/029135 dated Feb. 19, 2019.

International Search Report for PCT/JP2017/029135 dated Nov. 7, 2017 [PCT/ISA/210].

* cited by examiner

MOLDED ARTICLE AND MANUFACTURING METHOD FOR MOLDED ARTICLE

CROSS REFERENCE TO RELATED APPLICATIONS

This application is a National Stage of International Application No. PCT/JP2017/029135 filed Aug. 10, 2017, claiming priority based on Japanese Patent Application No. 2016-159620 filed Aug. 16, 2016.

TECHNICAL FIELD

The invention relates to molded articles and methods for manufacturing molded articles.

BACKGROUND ART

Fluororesins have excellent characteristics such as heat resistance and chemical resistance, and are therefore used for linings of pipes and tanks, chemical transfer pipes, joints, and chemical storage containers for semiconductor manufacturing processes and chemical plants, and materials of films and sheets. Fluororesins are also used for insulating layers for electric wires.

For example, Patent Literature 1 aims to improve the abrasion resistance of an electric wire containing a fluororesin and discloses a method for producing an electric wire including irradiating an insulating layer of an electric wire containing a fluororesin with an electron beam, wherein the electron beam irradiation is performed at a temperature lower than the crystal melting point of the fluororesin and in the air so as to satisfy at least one of the following conditions (1) to (3):

(1) $0.5 \leq Mb/Ma < 1.2$, wherein Ma is the melt flow rate (g/10 min) of the fluororesin before the electron beam irradiation; and Mb is the melt flow rate (g/10 min) of the fluororesin after the electron beam irradiation;

(2) $1 \leq Tb-Ta < 6.5$, wherein Ta is the crystal melting point (° C.) of the fluororesin before the electron beam irradiation; and Tb is the crystal melting point (° C.) of the fluororesin after the electron beam irradiation; and (3) an exposure lower than 30 kGy.

CITATION LIST

Patent Literature

Patent Literature 1: WO 2015/129762

SUMMARY OF INVENTION

Technical Problem

Tetrafluoroethylene/perfluoro(alkylvinylether) copolymers (PFAs) and tetrafluoroethylene/hexafluoropropylene copolymers (FEPs) among the fluororesins are water-repellent materials having a water contact angle of 100° to 120°. This water-repellency causes difficulty in cleaning off contaminants and dusts attached to the surfaces of products formed of these fluororesins with water. Adding a surfactant or an alcohol to water to enable easy wetting may be a solution, but these substances are unsuitable for cleaning of transfer pipes for high-purity chemicals used in semiconductor plants and fluororesin parts used in semiconductor manufacturing devices because they cause contamination.

In view of the above state of the art, the invention aims to provide a molded article having excellent hydrophilicity even though it contains the above fluororesin. The invention also aims to provide a method for manufacturing a molded article having excellent hydrophilicity and containing the above fluororesin.

Solution to Problem

The inventors examined a solution to the above issue to find that a molded article having a specific melt flow rate and a specific water contact angle can have significantly excellent hydrophilicity even though it contains a fluororesin that contains at least one copolymer selected from the group consisting of a copolymer containing a tetrafluoroethylene unit and a perfluoro(alkylvinylether) unit and a copolymer containing a tetrafluoroethylene unit and a hexafluoropropylene unit. Thereby, the inventors completed the invention. The inventors also found that irradiating a molded article with radiation at a specific irradiation temperature and exposure in the presence of air can provide a molded article having excellent hydrophilicity.

Specifically, the invention relates to a molded article containing a fluororesin, the molded article having a melt flow rate of 1.00 g/10 min or lower and a water contact angle of 90° or smaller, the fluororesin containing at least one copolymer selected from the group consisting of a copolymer containing a tetrafluoroethylene unit and a perfluoro(alkylvinylether) unit and a copolymer containing a tetrafluoroethylene unit and a hexafluoropropylene unit.

Preferably, the molded article of the invention contains 100 to 1000 functional groups on at least a surface thereof per $10^6$ carbon atoms in a main chain, and the functional groups include a —OH group, a —COF group, and a —COOH group.

The molded article of the invention is preferably a tube.

The invention also relates to a method for manufacturing a molded article including: molding a fluororesin to provide an untreated molded article; and irradiating the untreated molded article with 40 to 100 kGy of radiation at 80° C. to 240° C. in the presence of air, the fluororesin containing at least one copolymer selected from the group consisting of a copolymer containing a tetrafluoroethylene unit and a perfluoro(alkylvinylether) unit and a copolymer containing a tetrafluoroethylene unit and a hexafluoropropylene unit.

In the manufacturing method of the invention, the irradiation preferably causes a melt flow rate increasing rate of 0% or lower. The radiation is preferably an electron beam. The irradiation is preferably performed at a temperature lower than a melting point of the fluororesin.

The irradiation is preferably performed in the presence of water.

In the manufacturing method of the invention, the molded article is preferably a tube.

Advantageous Effects of Invention

The molded article of the invention has excellent hydrophilicity even though it contains a fluororesin that contains at least one copolymer selected from the group consisting of a copolymer containing a tetrafluoroethylene unit and a perfluoro(alkylvinylether) unit and a copolymer containing a tetrafluoroethylene unit and a hexafluoropropylene unit. The method for manufacturing a molded article of the invention enables production of a molded article having excellent hydrophilicity and containing the above fluororesin.

DESCRIPTION OF EMBODIMENTS

The invention is specifically described hereinbelow.

The molded article of the invention contains a fluororesin that contains at least one copolymer selected from the group consisting of a copolymer containing a tetrafluoroethylene unit and a perfluoro(alkylvinylether) unit and a copolymer containing a tetrafluoroethylene unit and a hexafluoropropylene unit, and has a MFR of 1.00 g/10 min or lower and a water contact angle of 90° or smaller. These features allow the molded article of the invention to have significantly excellent hydrophilicity even though the molded article contains the above fluororesin. With excellent hydrophilicity, the molded article is expected to be cleaned with water easily. With the above MFR and water contact angle, the molded article has not only excellent hydrophilicity but also excellent mechanical properties such as abrasion resistance.

The fluororesin preferably has a melting point of 190° C. to 347° C. The melting point is more preferably 200° C. or higher, still more preferably 220° C. or higher, particularly preferably 280° C. or higher, while more preferably 322° C. or lower. The melting point is the temperature corresponding to the maximum value on a heat-of-fusion curve obtained by increasing the temperature at a rate of 10° C./min using a differential scanning calorimeter (DSC).

The fluororesin contains at least one copolymer selected from the group consisting of a copolymer containing a tetrafluoroethylene unit (TFE unit) and a perfluoro(alkylvinylether) unit (PAVE unit) (hereinafter, referred to as a "TFE/PAVE copolymer" or "PFA") and a copolymer containing a TFE unit and a hexafluoropropylene unit (HFP unit) (hereinafter, referred to as a "TFE/HFP copolymer" or "FEP"). The presence of such a copolymer can lead to a melt viscosity as low as one millionth of that of polytetrafluoroethylene at the melting point or higher. Thus, the copolymer has better fluidity than polytetrafluoroethylene that does not flow even at the melting point or higher. The fluororesin is usually a melt-fabricable fluororesin. In order to achieve excellent crack resistance of an injection-molded article, for example, a TFE/PAVE copolymer is further preferred.

The PAVE constituting the TFE/PAVE copolymer may contain at least one selected from the group consisting of:
those represented by the following formula (1):

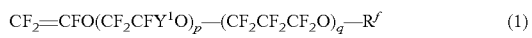

$CF_2=CFO(CF_2CFY^1O)_p—(CF_2CF_2CF_2O)_q—R^f$ (1)

wherein $Y^1$ is F or $CF_3$; $R^f$ is a C1-C5 perfluoroalkyl group; p is an integer of 0 to 5; and q is an integer of 0 to 5; and
those represented by the following formula (2):

$CFX=CXOCF_2OR^1$ (2)

wherein Xs are the same as or different from each other, and are each H, F, or $CF_3$; and $R^1$ is a linear or branched C1-C6 fluoroalkyl group optionally containing one or two atoms which include at least one selected from the group consisting of H, Cl, Br, and I, or a C5-C6 cyclic fluoroalkyl group optionally containing one or two atoms which include at least one selected from the group consisting of H, Cl, Br, and I.

The PAVE is preferably one having a bulky side chain; specifically, perfluoro(propylvinylether) (PPVE) is preferred.

The TFE/PAVE copolymer preferably contains 1.0 to 10% by mass of the PAVE unit relative to all the polymerized units.

The amount of the PAVE unit is more preferably 2.0% by mass or more, still more preferably 3.5% by mass or more, particularly preferably 4.0% by mass or more, most preferably 5.0% by mass or more, while more preferably 8.0% by mass or less, still more preferably 7.0% by mass or less, particularly preferably 6.5% by mass or less, most preferably 6.0% by mass or less, of all the polymerized units.

The amount of the PAVE unit is determined by $^{19}$F-NMR.

The TFE/PAVE copolymer preferably has a melting point of 280° C. to 322° C.

The melting point is more preferably 290° C. or higher and 315° C. or lower.

The melting point is the temperature corresponding to the maximum value on a heat-of-fusion curve obtained by increasing the temperature at a rate of 10° C./min using a differential scanning calorimeter (DSC).

The TFE/PAVE copolymer preferably has a glass transition temperature (Tg) of 70° C. to 110° C. The glass transition temperature is more preferably 80° C. or higher and 100° C. or lower.

The glass transition temperature is a value determined by dynamic mechanical analysis.

The TFE/PAVE copolymer may be produced by any conventionally known method in which, for example, monomers to provide structural units thereof and additives such as a polymerization initiator are mixed as appropriate and the monomers are polymerized by emulsion polymerization or suspension polymerization.

The TFE/HFP copolymer contains a tetrafluoroethylene (TFE) unit and a hexafluoropropylene (HFP) unit.

The TFE/HFP copolymer preferably has a mass ratio of the TFE unit to the HFP unit (TFE/HFP) of (70 to 99)/(1 to 30) (% by mass). The mass ratio (TFE/HFP) is more preferably (85 to 95)/(5 to 15) (% by mass).

The TFE/HFP copolymer preferably further contains a perfluoro(alkylvinylether) (PAVE) unit. Examples of the PAVE unit contained in the TFE/HFP copolymer include the same as those mentioned for the PAVE unit constituting the TFE/PAVE copolymer. More preferred is PPVE.

The TFE/PAVE copolymer is different from the TFE/HFP/PAVE copolymer in that it contains no HFP unit.

The TFE/HFP copolymer, when it is a copolymer containing a TFE unit, a HFP unit, and a PAVE unit (hereinafter, also referred to as a "TFE/HFP/PAVE copolymer"), the mass ratio (TFE/HFP/PAVE) is preferably (70 to 99.8)/(0.1 to 25)/(0.1 to 25) (% by mass). The copolymer having a mass ratio within this range can have excellent heat resistance and chemical resistance.

The mass ratio (TFE/HFP/PAVE) is more preferably (75 to 98)/(1.0 to 15)/(1.0 to 10) (% by mass).

The TFE/HFP/PAVE copolymer contains the HFP unit and the PAVE unit in an amount of 1% by mass or more in total.

The amount of the HFP unit in the TFE/HFP/PAVE copolymer is preferably 25% by mass or less of all the monomer units. The HFP unit in an amount within the above range can lead to a molded article having excellent heat resistance. The amount of the HFP unit is more preferably 20% by mass or less, still more preferably 18% by mass or less, particularly preferably 15% by mass or less. The amount of the HFP unit is preferably 0.1% by mass or more, more preferably 1% by mass or more, particularly preferably 2% by mass or more.

The amount of the HFP unit can be determined by $^{19}$F-NMR.

The amount of the PAVE unit is more preferably 20% by mass or less, still more preferably 10% by mass or less, particularly preferably 3% by mass or less. The amount of the PAVE unit is preferably 0.1% by mass or more, more preferably 1% by mass or more. The amount of the PAVE unit can be determined by $^{19}$F-NMR.

The TFE/HFP copolymer may further contain a different ethylenic monomer ($\alpha$) unit.

The different ethylenic monomer ($\alpha$) unit may be any monomer unit copolymerizable with the TFE unit and the HFP unit, and also the PAVE unit in the case of a TFE/HFP/PAVE copolymer. Examples thereof include fluorine-containing ethylenic monomers such as vinyl fluoride (VF), vinylidene fluoride (VdF), and chlorotrifluoroethylene (CTFE) and non-fluorinated ethylenic monomers such as ethylene, propylene, and alkyl vinyl ethers.

For the copolymer which is a copolymer of TFE/HFP/PAVE/different ethylenic monomer ($\alpha$), the mass ratio (TFE/HFP/PAVE/different ethylenic monomer ($\alpha$)) is preferably (70 to 98)/(0.1 to 25)/(0.1 to 25)/(0.1 to 25) (% by mass). The TFE/HFP copolymer contains the polymerized units other than the TFE unit in an amount of 1% by mass or more in total.

The TFE/HFP copolymer preferably has a melting point of 200° C. to 322° C. The copolymer having a melting point lower than 200° C. may have low hardness, being unsuitable to a molded article. The copolymer having a melting point higher than 322° C. may suffer cleavage of the main chain and may be divided into low molecular weight molecules, causing poor mechanical strength. The melting point is more preferably higher than 200° C., still more preferably 220° C. or higher, while more preferably 300° C. or lower, still more preferably 280° C. or lower. The melting point is the temperature corresponding to the maximum value on a heat-of-fusion curve obtained by increasing the temperature at a rate of 10° C./min using a differential scanning calorimeter (DSC).

The TFE/HFP copolymer preferably has a glass transition temperature (Tg) of 60° C. to 110° C., more preferably 65° C. or higher, while more preferably 100° C. or lower. The glass transition temperature is a value determined by dynamic mechanical analysis.

The TFE/HFP copolymer may be produced by any conventionally known method in which, for example, monomers to provide structural units thereof and additives such as a polymerization initiator are mixed as appropriate and the monomers are polymerized by emulsion polymerization, solution polymerization, or suspension polymerization.

The fluororesin also preferably contains the TFE/PAVE copolymer and the TFE/HFP copolymer. In other words, the TFE/PAVE copolymer and the TFE/HFP copolymer may be used in the form of a mixture. The mass ratio of the TFE/PAVE copolymer and the TFE/HFP copolymer ((A)/(B)) is preferably 1/9 to 7/3. The mass ratio is more preferably 5/5 to 2/8.

The fluororesin is preferably a perfluororesin. The perfluororesin as used herein means a resin containing a perfluoropolymer in which every monovalent atom binding to any of the carbon atoms constituting the polymer main chain is a fluorine atom.

It should be noted that groups other than the monovalent atoms (fluorine atoms) such as fluoroalkyl groups and fluoroalkoxy groups may be bonded to the carbon atoms constituting the polymer main chain. Also, it should be noted that the polymer end groups, in other words, the groups that terminate the polymer chain may include an atom other than the fluorine atoms. In most cases, the polymer end groups are groups derived from the chemical structure of a polymerization initiator or a chain transfer agent, optionally after pyrolysis, used for the polymerization reaction.

The mixture is preferably prepared by a known method such as a method of melt-mixing (melt-kneading) two or more fluororesins having different melting points or a method of mixing resin dispersions after emulsion polymerization, coagulating the resin with an acid such as nitric acid, and collecting the resin. The melt-mixing is preferably performed at a temperature that is not lower than the highest melting point of the two or more fluororesins having different melting points.

In order to provide a molded article having excellent heat resistance and chemical resistance, the fluororesin is preferably a TFE/PAVE copolymer, more preferably a copolymer consisting of a TFE unit and a PAVE unit. The TFE/PAVE copolymer preferably contains 1.0 to 10% by mass of the PAVE unit relative to all the polymerized units. The amount of the PAVE unit is more preferably 2.0% by mass or more, still more preferably 3.5% by mass or more, particularly preferably 4.0% by mass or more, most preferably 5.0% by mass or more, while more preferably 8.0% by mass or less, still more preferably 7.0% by mass or less, particularly preferably 6.5% by mass or less, most preferably 6.0% by mass or less, of all the polymerized units.

The fluororesin may contain functional groups to the extent that does not impair the characteristics of the fluororesin. The functional groups include a functional group present at an end of the main chain or an end of a side chain of the copolymer and a functional group in the main chain or a side chain.

The functional groups can be introduced by a known method. Examples thereof include a method of using a chain transfer agent in polymerization of monomers and a method of using a polymerization initiator to start polymerization. Polymerization of monomers containing functional groups also enables introduction of the functional groups into a side chain end of the fluororesin copolymer.

The molded article has a melt flow rate (MFR) of 1.00 g/10 min or lower. In order to allow the molded article to have better mechanical properties and crack resistance, the MFR is preferably 0.90 g/10 min or lower, more preferably 0.70 g/10 min or lower, still more preferably 0.50 g/10 min or lower, particularly preferably 0.20 g/10 min or lower.

The MFR is defined as the mass (g/10 min) of the polymer that flows out of a nozzle having an inner diameter of 2 mm and a length of 8 mm per 10 minutes at 372° C. and a load of 5 kg using a melt indexer (Yasuda Seiki Seisakusho Ltd.) in conformity with ASTM D3307.

The molded article has a water contact angle of 90° or smaller. In order to allow the molded article to have better hydrophilicity, the water contact angle is preferably 87° or smaller, more preferably 83° or smaller, still more preferably 80° or smaller, particularly preferably 75° or smaller.

The water contact angle is a value determined using a water contact angle meter CA-A (Kyowa Interface Science Co., Ltd.).

The molded article needs not to satisfy the above water contact angle on the entire surface thereof, but has only to satisfy it only on part of the surface thereof. For example, the molded article satisfying the above water contact angle only on part that requires hydrophilicity can sufficiently exert the effects of the invention.

Preferably, the molded article of the invention contains on at least a surface thereof 70 to 1000 functional groups per $10^6$ carbon atoms in the main chain, and the functional groups include a —OH group, a —COF group, and a —COOH group. The molded article containing these functional groups within the above range can have excellent hydrophilicity.

The number of the functional groups of the molded article is more preferably 100 or more, still more preferably 160 or more, further more preferably 280 or more, particularly preferably 500 or more, per $10^6$ carbon atoms in the main chain. The number of the functional groups is more preferably 1000 or less, still more preferably 950 or less, particularly preferably 900 or less. The number of the functional groups is a value determined by the following method. The —COOH group is either a —COOH free group or a —COOH bonded group shown in the following Table 1.

The molded article needs not to satisfy the above number of the functional groups on the entire surface thereof, but has only to satisfy it only on part of the surface thereof. For example, the molded article has only to satisfy the above number of the functional groups on part that requires hydrophilicity. The molded article of the invention has only to contain at least one selected from a —OH group, a —COF group, and a —COOH group.

(Method of Measuring Number of Functional Groups)

A sample having a thickness of 0.15 to 0.3 mm is cut out of the surface of the molded article, and the sample is manually pressed to provide a film having a thickness of 0.15 to 0.2 mm. This film is scanned 40 times and analyzed to provide an infrared absorption spectrum using a Fourier transform infrared (FT-IR) spectrometer (trade name: 1760 X, PerkinElmer Co., Ltd.). Then, a difference spectrum is obtained with a base spectrum of a sample which is completely fluorinated and thus contains no functional group. Based on the absorption peaks of the specific functional groups in the difference spectrum, the number N of the functional groups per 1×$10^6$ carbon atoms in the sample is calculated from the following formula (A):

$$N = I \times K / t \quad (A)$$

I: absorbance
K: correction coefficient
t: thickness of film (mm)

For reference, the absorption frequency, molar extinction coefficient, and correction coefficient of the functional groups in the present description are shown in Table 1. The molar extinction coefficient is determined from the FT-IR measurement data of a low molecular weight model compound.

absorption peak at an absorption frequency of 1840 $cm^{-1}$ assigned to —$CH_2COF$.

A semiconductor manufacturing device, for example, uses a variety of highly oxidative chemicals such as hydrofluoric acid, hydrochloric acid, nitric acid, sulfuric acid, phosphoric acid, ozonated water, and hydrogen peroxide. In order to minimize oxidative degradation due to chemicals, the molded article, when used as a part of a semiconductor manufacturing device, more preferably contains a carboxylic group (—COOH group) having the highest oxidation level among the functional groups.

The molded article of the invention may further contain a different component in addition to the TFE/PAVE copolymer and the TFE/HFP copolymer, if necessary. Examples of the different component include additives such as a cross-linking agent, an antistatic agent, a heat stabilizer, a blowing agent, a foam nucleating agent, an antioxidant, a surfactant, a photo-polymerization initiator, an anti-wear agent, and a surface modifier.

Although the molded article of the invention may contain any of the different components, the sum of the amounts of the TFE/PAVE copolymer and the TFE/HFP copolymer is preferably 80% by mass or more, more preferably 90% by mass or more, still more preferably 95% by mass or more.

The molded article of the invention may contain polytetrafluoroethylene (PTFE), and the molded article may be prepared by adding PTFE to the TFE/PAVE copolymer, the TFE/HFP copolymer, or a mixture thereof. Examples of a mixing method include, but not limited to, mixing of liquids prepared by emulsion-dispersing resins, mixing of liquids prepared by solution-dispersing resins, mixing of molten resins, and mixing of powders.

In this case, the amount of the PTFE is preferably 0.01 to 60% by mass, more preferably 0.05 to 55% by mass, still more preferably 0.1 to 50% by mass, relative to the sum of the amounts of the TFE/PAVE copolymer, the TFE/HFP copolymer, and the polytetrafluoroethylene.

The amount of PTFE is preferably 20% by mass or less, more preferably 5% by mass or less, still more preferably 1% by mass or less, relative to the sum of the amounts of the TFE/PAVE copolymer, the TFE/HFP copolymer, and the polytetrafluoroethylene.

TABLE 1

| Functional group | Absorption frequency ($cm^{-1}$) | Molar extinction coefficient (l/cm/mol) | Correction coefficient | Model compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —CF=$CF_2$ | 1795 | 635 | 366 | $CF_2$=$CF_2$ |

The absorption frequencies of —$CH_2CF_2H$, —$CH_2COF$, —$CH_2COOH$, —$CH_2COOCH_3$, and —$CH_2CONH_2$ are respectively lower than the absorption frequencies of —$CF_2H$, —COF, —COOH free and —COOH bonded, —$COOCH_3$, and —$CONH_2$ shown in the table by several tens of kaysers ($cm^{-1}$). Thus, for example, the number of functional groups for —COF is the sum of the number of functional groups calculated from the absorption peak at an absorption frequency of 1883 $cm^{-1}$ assigned to —$CF_2COF$ and the number of functional groups calculated from the The PTFE to be added is either a TFE homopolymer or a modified PTFE containing more than 99% by mass of TFE and less than 1% by mass of a modifying monomer. Examples of the modifying monomer include hexafluoropropylene (HFP), perfluoro(alkylvinylether) (PAVE), fluoroalkyl ethylene, and chlorotrifluoroethylene (CTFE). These modifying monomers may be used alone or in combination of two or more.

The PTFE preferably has a melting point of 315° C. to 350° C.

The molded article of the invention preferably has a thickness of 0.01 to 5.0 mm, more preferably 0.2 mm or greater, still more preferably 0.5 mm or greater, while more preferably 3.0 mm or smaller.

The molded article of the invention may be in the form of, but not limited to, pellets, a film, a sheet, a plate, a rod, a block, a cylinder, a container, a wafer carrier, a coating material for an electric wire, or a tube.

The molded article of the invention may also be in the form of a coating layer for cooking utensils such as inner pots of rice cookers, electric griddles, and frying pans, or a fluororesin film for forming top coat layers of fixing rollers for image-forming devices such as electrophotographic or electrostatic recording copiers and laser printers.

The molded article of the invention is preferably a tube, a sheet, or a container. The tube, sheet, and container are usually produced by extrusion molding, compression molding, blow molding, or injection molding; in many cases, they are produced by extrusion molding.

The molded article of the invention is preferably a tube. The tube preferably has a water contact angle of 90° or smaller on the inner surface thereof. In this case, the water contact angle on the outer surface thereof may be greater than 90°, or may be 90° or smaller. The tube having a water contact angle of 90° or smaller on the inner surface thereof and a water contact angle greater than 90° on the outer surface thereof can be produced by the production method to be described later.

The tube preferably has a thickness of 0.025 mm or greater, more preferably 1 mm or greater. The upper limit of the thickness may be, but not limited to, 20 mm or smaller when the hydrophilicity on the inner surface of the tube is 90° or smaller.

The molded article of the invention can particularly suitably be used as, for example, a tube for transfer of a gas or chemical, an article for storage of a chemical, such as a bottle, a gas bag, a chemical bag, a chemical container, or a bag for refrigerated storage, or a part for a chemical filter.

The molded article of the invention has excellent hydrophilicity even though it contains the fluororesin, and thus can be cleaned with water easily. Accordingly, the molded article of the invention is particularly suitable as a pipe for transfer of a high purity chemical or a part for a semiconductor manufacturing device each requiring high purity.

The molded article of the invention can suitably be used for chemical transfer tubes, joints, valves, strainers, chemical containers, vacuum tweezers, packings, gaskets, lining materials, tweezers, graduated cylinders, baskets, stirring rods, beakers, cleaning wipes, tanks, nuts, trays, wafer carriers, handles for wafer carriers, LCD baskets, and parts for chemical filters.

The molded article of the invention can suitably be produced by the method to be described below.

The method for manufacturing a molded article of the invention includes molding a fluororesin containing at least one copolymer selected from the group consisting of a copolymer containing a tetrafluoroethylene unit and a perfluoro(alkylvinylether) unit and a copolymer containing a tetrafluoroethylene unit and a hexafluoropropylene unit to provide an untreated molded article, and irradiating the untreated molded article with 40 to 100 kGy of radiation at 80° C. to 240° C. in the presence of air to provide a molded article.

The fluororesin usually has a water contact angle of 100° to 120°, and thus has poor wettability. This water-repellency causes difficulty in cleaning off contaminants and dusts attached to the surfaces of products formed of the fluororesin with water.

Examples of a method of treating the surface of the fluororesin include plasma treatment in the presence of hydrogen or oxygen gas, water, or alcohol to introduce functional groups such as hydroxy groups and corona treatment in the presence of acetone or air to introduce functional groups containing oxygen. Examples thereof also include physical treatment by sputter etching in the presence of vapor and excimer laser treatment in the presence of a defluorination reagent such as a boron compound to introduce functional groups. Chemical etching using a solution containing metal sodium may also be mentioned as an example.

Unfortunately, these techniques cause issues such as safety of handling metal sodium, waste fluids containing metal sodium, discoloration of treated articles, and loss of treating effects due to heating or ultraviolet rays. Further, these techniques cause formation of carbides on the fluororesin surfaces and physical coarsening of the surfaces, and such defects cause contamination and particle dust emission. Thus, these techniques are unsuitable to fluororesin parts for semiconductor-related applications requiring high purity.

Reducing the water contact angle of the fluororesin from 100° or greater to 90° or smaller has been significantly difficult because the C—F bonds constituting the resin are significantly firm and chemically inactive. Some special techniques are considered, such as copolymerization with a hydrophilic third monomer and graft polymerization of hydrophilic monomers. Still, monomers having hydrophilicity have poor chemical resistance, so that they impair the characteristics of the fluororesin, i.e., chemical resistance, oxidation resistance such as ozone resistance, heat resistance, and high purity.

The manufacturing method of the invention enables direct introduction of hydrophilic functional groups into only the surface of a molded article containing a fluororesin without increasing the MFR by applying radiation at a specific exposure and temperature in the presence of air. Thus, the method can improve the hydrophilicity of the surface of the molded article without impairing the intrinsic characteristics of the perfluororesin and, for example, can control the water contact angle to 90° or smaller.

Introduction of functional groups having polarity onto the surface of the molded article by the above method can provide hydrophilicity while maintaining the chemical resistance, so that the surface of the molded article is less likely to be charged with electricity. This can presumably reduce attachment of dust and improve the easiness of cleaning with water, for example.

The manufacturing method of the invention causes neither formation of carbides on the surface of the molded article nor physical coarsening of the surface. This can reduce contamination and particle dust emission as described above.

The manufacturing method of the invention can reduce the MFR to lead to a high molecular weight.

The fluororesin used in the manufacturing method of the invention contains at least one copolymer selected from the group consisting of a copolymer containing a tetrafluoroethylene unit and a perfluoro(alkylvinylether) unit and a copolymer containing a tetrafluoroethylene unit and a hexafluoropropylene unit. The fluororesin is usually a melt-fabricable fluororesin. In order to achieve excellent crack resistance of an injection-molded article obtained by the manufacturing method, the TFE/PAVE copolymer is further preferred.

Examples of the method of molding the fluororesin include, but not limited to, known methods such as extrusion molding, injection molding, transfer molding, blow molding, inflation molding, and compression molding. Any of these molding methods may be selected as appropriate in accordance with the form of a molded article to be obtained.

The method of molding the fluororesin is preferably extrusion molding, blow molding, compression molding, or injection molding, more preferably extrusion molding. These molding methods can easily produce molded articles such as tubes, sheets, and containers. These molding methods can easily produce molded articles having a small thickness such as tubes, films, and containers. In these molding methods, the fluororesin is fluidized by heat before molding.

When the manufacturing method of the invention provides a molded article containing a different component in addition to the fluororesin containing at least one copolymer selected from the group consisting of a copolymer containing a tetrafluoroethylene unit and a perfluoro(alkylvinylether) unit and a copolymer containing a tetrafluoroethylene unit and a hexafluoropropylene unit, a mixture of the fluororesin and the different component is preferably prepared by mixing them by a known method. Then, preferably, the resulting mixture is molded and the molded mixture is irradiated with radiation. The molding method may be the same as any of the aforementioned methods, and the method of irradiating the mixture with radiation may be the same as any of the aforementioned methods.

The method for manufacturing a molded article of the invention includes irradiating an untreated molded article obtained by molding the fluororesin with 40 to 100 kGy of radiation at 80° C. to 240° C. in the presence of air.

Irradiation of the fluororesin with radiation causes elimination of fluorine atoms as fluorine radicals. At this time, the fluorine radicals may react with reactive radicals if present, but in many cases they rebind to the fluororesin or form a crosslink via bonds with radicals cleaved from the main chain. The air usually contains about 78% nitrogen, about 21% oxygen, about 0.04% carbon dioxide, and small amounts of hydrogen, methane, and water. Thus, presumably, electron beam irradiation in the presence of air generates a variety of radicals such as oxygen radicals and hydrogen radicals, causing introduction of functional groups owing to reactions with carbon radicals generated on the fluororesin surface.

In particular, PFA and FEP contain side chains, so that functional groups are presumably likely to bind to carbons of these side chains even when the irradiation temperature is lower than the melting point of the fluororesin.

Irradiation of the fluororesin with radiation in the presence of air generates functional groups such as an acid fluoride group (—COF) and a carboxylic group (—COOH). The molded article obtained by the manufacturing method of the invention can have a water contact angle of 90° or smaller and thus can have significantly improved hydrophilicity on the surface thereof even though the untreated molded article before the irradiation has a water contact angle of 100° or greater.

The irradiation has only to be performed in the presence of air, and the air may be diluted. Still, the concentration of the air is preferably 0.5% by mass or more, more preferably 50% by mass or more, relative to the gas around the molded article.

In the case of using a reaction container, the composition of gas introduced into the reaction container has only to be controlled. The air preferably occupies 0.5% by mass or more, more preferably 50% by mass or more, of the gas to be introduced.

In order to improve the hydrophilicity of the molded article on the inner surface thereof, the air has only to be present around the inner surface of the molded article. For example, in order to improve the hydrophilicity of the tube on the inner surface, the ends of the tube may be closed with the air present inside the tube, so that radiation may be applied with the air present inside the tube. Without the air around the outer surface of the tube, the hydrophilicity of the inner surface of the tube alone can be improved.

The irradiation is preferably performed further in the presence of water. The presence of water can significantly improve the hydrophilicity of the molded article to be obtained.

The concentration of water in the air depends on the temperature and the humidity. Assuming that the environmental temperature is 25° C. to 40° C. and the humidity is 40 to 100% in typical cases upon introduction of the air, the concentration of water is 0.001 to 0.005 g/100 cc, which is a preferred range.

When the irradiation is performed in the presence of water, the concentration of water is preferably 0.0015 g/100 cc or more, still more preferably 0.0020 g/100 cc or more. The upper limit thereof may be, but not limited to, 1.000 g/100 cc. The concentration of water is preferably 0.500 g/100 cc or less, more preferably 0.300 g/100 cc or less, still more preferably 0.100 g/100 cc or less. The concentration of water is also preferably 0.005 g/100 cc or less in order to achieve a good working environment.

In the case of enclosing water in the molded article, the upper limit of the amount of water added can be determined by calculating the pressure from the relation of the amount of water, the capacity of the molded article, and the temperature because water becomes vapor when the irradiation temperature is 100° C. or higher.

In other words, the calculation is performed with the equation of state of gas: $PV=w/M \times R \times (273+t)$, wherein P (atm) is the pressure; V (L) is the capacity which is 0.1 L; w (gr) is the amount of water enclosed per 100 cc capacity of the molded article; M is the molecular weight of water which is 18; R is the gas constant which is 0.082; and t is the temperature which is 240° C.

For the molded article which is a tube, for example, the burst pressure thereof depends on factors such as the size and the thickness of the wall, and is usually 1 to 6 MPa. The burst pressure is suitably 0.33 to 2.0 MPa (3.3 to 20 atm) because the tube having a burst pressure within this range does not expand even when the temperature is increased up to a maximum of 240° C. According to the above relation, the amount of water enclosed is preferably 0.04 to 0.86 g/100 cc (capacity of molded article).

A thick molded article capable of withstanding a pressure of 2.0 MPa or higher may enclose more than 0.86 g/100 cc (capacity of molded article) of water. This amount is sufficient for providing hydrophilicity, and thus the amount of water needs not to be increased more. Water may be supplied as highly humidified air. Still, in a flow system, an abatement system is required.

The exposure of the radiation is 40 to 100 kGy. The exposure is preferably 95 kGy or lower, more preferably 90 kGy or lower, still more preferably 80 kGy or lower, while preferably 50 kGy or higher, more preferably 60 kGy or higher. Too high an exposure may cause a high MFR, which is disadvantageous to mechanical strength such as crack resistance. Too low an exposure may cause insufficient hydrophilicity.

The irradiation temperature is 80° C. to 240° C. The irradiation temperature is preferably 100° C. or higher, more preferably 110° C. or higher, while preferably 220° C. or lower. Too high an irradiation temperature may have an influence on the physical properties due to radiation in addition to the influence on the hydrophilicity. Too low an irradiation temperature may cause poor mobility of molecules, may preferentially cause molecule cleavage, and may cause an increase in MFR, which is disadvantageous to mechanical strength such as crack resistance.

The irradiation temperature preferably falls within the above range and is lower than the melting point of the fluororesin.

The irradiation temperature may be controlled by any known method. Specific examples thereof include a method of holding the fluororesin in a heating furnace maintained at a predetermined temperature and a method of placing the fluororesin on an electric griddle and heating the electric griddle by supplying electricity to a built-in heater or with an external heating device.

Examples of the radiation include electron beams, ultraviolet rays, gamma rays, X-rays, neutron beams, and high-energy ions. Particularly preferred are electron beams because they have excellent permeability, a high dose rate, and are suitable for industrial production.

An example of a method of applying radiation may be, but not limited to, the use of a conventionally known irradiation device.

In the method for manufacturing a molded article of the invention, the irradiation preferably causes a MFR increasing rate of 0% or lower. In other words, in the method for manufacturing a molded article of the invention, the percent increase of the MFR of the molded article to the MFR of the untreated molded article is preferably 0% or lower. With an MFR increasing rate of 0% or lower, the method can provide a molded article having excellent mechanical properties and crack resistance. The phrase "a MFR increasing rate of 0% or lower" means that the MFR does not increase between before and after the irradiation, in other words, the MFR of the molded article after the irradiation is lower than the MFR of the untreated molded article before the irradiation.

The method for manufacturing a molded article of the invention may further include heating the resulting molded article after the irradiation. The heating temperature is preferably 100° C. to 280° C. and the heating duration is preferably 1 to 10 hours.

The fluororesin before molding to be used in the method for manufacturing a molded article of the invention preferably has a melt flow rate (MFR) of 0.1 to 60 g/10 min at 372° C. With a MFR within the above range, the method can provide a molded article having excellent heat resistance and chemical resistance. The MFR is more preferably 1 g/10 min or higher, while more preferably 50 g/10 min or lower, still more preferably 30 g/10 min or lower.

The MFR is a value obtained as the mass (g/10 min) of the polymer that flows out of a nozzle having an inner diameter of 2 mm and a length of 8 mm per 10 minutes at 372° C. and a load of 5 kg using a melt indexer (Yasuda Seiki Seisakusho Ltd.) in conformity with ASTM D3307.

The manufacturing method of the invention is particularly suitable to produce a long PFA tube. A typical tube has a wall thickness of about 1.6 mm. Thus, an electron beam applied at an accelerating voltage of 2 MeV or higher in the presence of air inside the tube can be easily transmitted into the tube.

In a current state, an electron beam emitting device with an accelerating voltage of 10 MeV can be used, and a fluororesin having a thickness of about 20 mm can sufficiently be treated even when it has a specific gravity of 2 or higher. Thus, this treating method is an epoch-making method for providing hydrophilicity to the inner surface of the tube.

A molded article obtainable by the method for manufacturing a molded article of the invention is also one aspect of the invention.

The method for manufacturing a molded article of the invention may include extrusion-molding a TFE/PAVE copolymer to provide a tube having a thickness of 1 mm or greater and irradiating the tube containing the air (preferably, and water) therein with radiation at the aforementioned irradiation temperature and exposure.

The manufacturing method may further include closing the ends of the tube with the air (preferably, and water) present inside the tube. This manufacturing method can provide hydrophilicity to only the inner surface of the tube by applying radiation in a container purged with nitrogen, for example.

The manufacturing method of the invention is expected to improve the adhesiveness of a molded article. When the fluororesin is bonded to another material, adhesive is applied to the fluororesin. Still, unfortunately, the water-repellency thereof repels the adhesive, so that a designed technique needs to be performed, such as blasting or bonding owing to an anchoring effect obtained by preparing a porous fluororesin and allowing the adhesive to permeate thereinto. As the manufacturing method of the invention improves the hydrophilicity of a portion to be in contact with another material, the easiness of applying adhesive is also improved. Thus, the method is expected to give an effect of improving the adhesiveness to another material.

Further, conventional fluororesin molded articles have significant difficulty in holding letters printed on the surfaces thereof. Still, the manufacturing method of the invention is expected to give an effect of facilitating printing of letters on the molded article to be obtained.

EXAMPLES

The invention is described hereinbelow with reference to examples and comparative examples. Still, the invention is not intended to be limited to these examples.

The parameters in the examples and comparative examples were determined by the following methods.
MFR The MFR was defined as the mass (g/10 min) of the polymer that flows out of a nozzle having an inner diameter of 2 mm and a length of 8 mm per 10 minutes at 372° C. and a load of 5 kg using a melt indexer (Yasuda Seiki Seisakusho Ltd.) in conformity with ASTM D3307.
Number of Functional Groups A sample having a thickness of 0.15 to 0.3 mm was cut out of the surface of the molded article, and the sample was manually pressed to provide a film having a thickness of 0.15 to 0.2 mm. This film was scanned 40 times and analyzed to provide an infrared absorption spectrum using a Fourier transform infrared (FT-IR) spectrometer (trade name: 1760 X, PerkinElmer Co., Ltd.). Then, a difference spectrum was obtained with a base spectrum of a sample which is completely fluorinated and thus contains no functional group. Based on the absorption peaks of the specific functional groups in the difference spectrum, the number N of the functional groups per $1\times10^6$ carbon atoms in the sample was calculated from the following formula (A):

$$N = I \times K / t \tag{A}$$

I: absorbance
K: correction coefficient
t: thickness of film (mm)

For reference, the absorption frequency, molar extinction coefficient, and correction coefficient of the functional groups in the present description are shown in Table 2. The molar extinction coefficient is determined from the FT-IR measurement data of a low molecular weight model compound.

TABLE 2

| Functional group | Absorption frequency (cm$^{-1}$) | Molar extinction coefficient (l/cm/mol) | Correction coefficient | Model compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

Water Contact Angle

The water contact angle was determined using a water contact angle meter CA-A (Kyowa Interface Science Co., Ltd.).

Example 1

NEOFLON PFA AP-230SH pellets (MFR 2.4 (g/10 min), Daikin Industries, Ltd.) were molded using a tube extruder to provide a tube having an outer diameter of 12 mm and a thickness of 1.1 mm. The resulting tube was cut into a length of 40 cm. This piece was put into an electron beam irradiation container of an electron beam processing system (NHV Corp.), and the inside of the container was filled with the air. The temperature inside the container was increased up to 80° C. and stabilized at this temperature. Then, 40 kGy of an electron beam was applied at an electron beam accelerating voltage of 3 MeV and an exposure intensity of 20 kGy/5 min. The water contact angle of the resulting tube on the inner surface thereof and the MFR (melt flow rate) of the tube were determined. Further, the number of the functional groups of the resulting tube was determined. The results are shown in the following Table 4.

Examples 2 and 3

A tube was produced in the same manner as in Example 1, except that the temperature and atmosphere inside the container were changed as shown in the following Table 3.

Example 4

NEOFLON PFA AP-230SH pellets (MFR 2.4 (g/10 min), Daikin Industries, Ltd.) were molded using a heat-press molding machine to provide a 120-mm-diameter disc-shaped and 0.3-mm-thick sheet-shaped test piece. The resulting test piece was put into an electron beam irradiation container of an electron beam processing system (NHV Corp.), and the inside of the container was filled with the air. The temperature inside the container was increased up to 150° C. and stabilized at this temperature. Then, 80 kGy in total of an electron beam was applied to the test piece at an electron beam accelerating voltage of 3 MeV and an exposure intensity of 20 kGy/5 min. The water contact angle and MFR of the resulting sheet on the surface thereof, and the number of the functional groups of the sheet were determined. The results are shown in Table 4.

Example 5

The same process as in Example 4 was performed, except that the temperature inside the container was changed as shown in Table 3.

Example 6

The same process as in Example 4 was performed, except that the temperature and atmosphere inside the container were changed as shown in Table 3.

Example 7

NEOFLON PFA AP-230 pellets (MFR 2.2 (g/10 min), Daikin Industries, Ltd.) were molded using a heat-press molding machine to provide a 120-mm-diameter disc-shaped and 0.3-mm-thick sheet-shaped test piece. The resulting test piece was put into an electron beam irradiation container of an electron beam processing system (NHV Corp.), and the inside of the container was filled with the air. The temperature inside the container was increased up to 180° C. and stabilized at this temperature. Then, 40 kGy in total of an electron beam was applied to the test piece at an electron beam accelerating voltage of 3 MeV and an exposure intensity of 20 kGy/5 min. The water contact angle, the MFR (melt flow rate), and the number of the functional groups of the resulting sheet on the surface thereof were determined. The results are shown in Table 4.

Example 8

A tube was produced in the same manner as in Example 1, except that NEOFLON PFA AP-230 pellets (MFR 2.2 (g/10 min), Daikin Industries, Ltd.) were used as the PFA material. The electron beam irradiation was performed under the conditions shown in Table 3. The results are shown in Table 4. In Example 8, the concentration of water in the air present inside the tube was 0.10 g/100 cc upon electron beam irradiation.

Comparative Example 1

A tube was produced in the same manner as in Example 1, except that electron beam irradiation was not performed. The measurement results are shown in Table 4.

Comparative Example 2

A compressed sheet was produced in the same manner as in Example 4, except that electron beam irradiation was not performed. The measurement results are shown in Table 4.

Comparative Example 3 and Comparative Example 4

A compressed sheet was produced in the same manner as in Example 4, and irradiation was performed under the conditions as shown in Table 3. The measurement results are shown in Table 4.

Comparative Example 5

A compressed sheet was produced in the same manner as in Example 7, except that electron beam irradiation was not performed. The measurement results are shown in Table 4.

TABLE 3

| | Test piece | | | Electron beam irradiation conditions | | |
|---|---|---|---|---|---|---|
| | Material | Form | Thickness (mm) | Irradiation temperature (° C.) | Exposure (kGy) | Atmosphere |
| Comparative Example 1 | PFA (AP-230SH) | Tube (Outer diameter 12 mm) | 1.1 | Not irradiated | | |
| Example 1 | | | 1.1 | 80 | 40 | Air |
| Example 2 | | | 1.1 | 180 | 40 | Air |
| Example 3 | | | 1.1 | 240 | 40 | Nitrogen + air (1 vol %) |
| Comparative Example 2 | | Compressed sheet | 0.3 | Not irradiated | | |
| Comparative Example 3 | | | 0.3 | 25 | 110 | Air |
| Comparative Example 4 | | | 0.3 | 200 | 20 | Air |
| Example 4 | | | 0.3 | 150 | 80 | Air |
| Example 5 | | | 0.3 | 180 | 80 | Air |
| Example 6 | | | 0.3 | 240 | 80 | Nitrogen + air (1 vol %) |
| Comparative Example 5 | PFA (AP-230) | Compressed sheet | 0.3 | Not irradiated | | |
| Example 7 | | | 0.3 | 180 | 40 | Air |
| Example 8 | | Tube (outer diameter 12 mm) | 1.1 | 180 | 100 | Nitrogen + water (0.03 g/40 cm tube) |

TABLE 4

| | MFR (g/10 min) 372° C., 5 kg load (die 2 mmØ × 8 mmH) | Number of functional groups (per 1 million C atoms) | | | | | Water contact angle (degrees) |
|---|---|---|---|---|---|---|---|
| | | OH 3636 cm$^{-1}$ | COF 1880 cm$^{-1}$ | COOH free 1815 cm$^{-1}$ | COOH bond 1779 cm$^{-1}$ | Total (per 1 million C atoms) | |
| Comparative Example 1 | 2.4 | 0 | 0 | 0 | 0 | 0 | 111 |
| Example 1 | <0.1 | 0 | 167 | 153 | 290 | 610 | 90 |
| Example 2 | <0.1 | 0 | 203 | 166 | 494 | 863 | 83 |
| Example 3 | <0.1 | 0 | 171 | 157 | 312 | 640 | 87 |
| Comparative Example 2 | 2.1 | 0 | 0 | 0 | 0 | 0 | 110 |
| Comparative Example 3 | 85 | 0 | 110 | 15 | 35 | 150 | 102 |
| Comparative Example 4 | <0.1 | 0 | 88 | 17 | 38 | 143 | 105 |
| Example 4 | <0.1 | 0 | 180 | 47 | 55 | 282 | 90 |
| Example 5 | <0.1 | 0 | 337 | 87 | 119 | 544 | 86 |
| Example 6 | <0.1 | 0 | 205 | 8 | 92 | 306 | 90 |
| Comparative Example 5 | 2.2 | 13 | 29 | 18 | 0 | 60 | 101 |
| Example 7 | <0.1 | 1 | 239 | 37 | 60 | 338 | 80 |
| Example 8 | <0.1 | 10 | 0 | 240 | 260 | 510 | 71 |

In Comparative Example 3, the irradiation temperature was 25° C., i.e., lower than 80° C., and the exposure was 110 kGy, i.e., higher than 100 kGy. Thus, the resin was deteriorated and the MFR was high, so that the resin unfavorably became brittle and fragile. Similarly, the radiation at an irradiation temperature lower than 80° C. deteriorated the resin, so that the resin material unfavorably became brittle and fragile even though the exposure fell within the range of 40 to 100 kGy. Further, the radiation at an exposure higher than 100 kGy also deteriorated the resin, so that the resin material unfavorably became brittle and fragile even though the irradiation temperature fell within the range of 80° C. to 240° C.

The invention claimed is:

1. A molded article comprising a fluororesin,
    a surface of the molded article having a water contact angle of 90° or smaller,
    the fluororesin containing at least one copolymer selected from the group consisting of a copolymer containing a tetrafluoroethylene unit and a perfluoro(alkylvinylether) unit and a copolymer containing a tetrafluoroethylene unit and a hexafluoropropylene unit, and
    the whole of the molded article having a melt flow rate of 0.20 g/10 min or lower,
    the molded article is obtained by molding the fluororesin to provide an untreated molded article and irradiating the untreated molded article at a temperature of 110° C. to 240° C. in the presence of air.

2. The molded article according to claim 1,
    wherein the molded article contains 100 to 1000 functional groups on at least a surface thereof per $10^6$ carbon atoms in a main chain, and
    the functional groups include a —OH group, a —COF group, and a —COOH group.

3. The molded article according to claim 1,
    wherein the molded article is a tube.

4. A method for manufacturing the molded article according to claim 1, the method comprising:
    molding a fluororesin to provide an untreated molded article; and
    irradiating the untreated molded article with 40 to 100 kGy of radiation at 110° C. to 240° C. in the presence of air,
    the fluororesin containing at least one copolymer selected from the group consisting of a copolymer containing a tetrafluoroethylene unit and a perfluoro(alkylvinylether) unit and a copolymer containing a tetrafluoroethylene unit and a hexafluoropropylene unit.

5. The method for manufacturing the molded article according to claim 4,
    wherein the irradiation causes a melt flow rate increasing rate of 0% or lower.

6. The method for manufacturing the molded article according to claim 4,
    wherein the radiation is an electron beam.

7. The method for manufacturing the molded article according to claim 4,
    wherein the irradiation is performed at a temperature lower than a melting point of the fluororesin.

8. The method for manufacturing the molded article according to claim 4,
    wherein the molded article is a tube.

9. The molded article according to claim 1, wherein the whole of the molded article has a melt flow rate of <0.1 g/10 min.

* * * * *